Jan. 26, 1932.  A. L. JOHNSON  1,842,405
ROCK DRILL
Filed Nov. 19, 1930  2 Sheets-Sheet 1
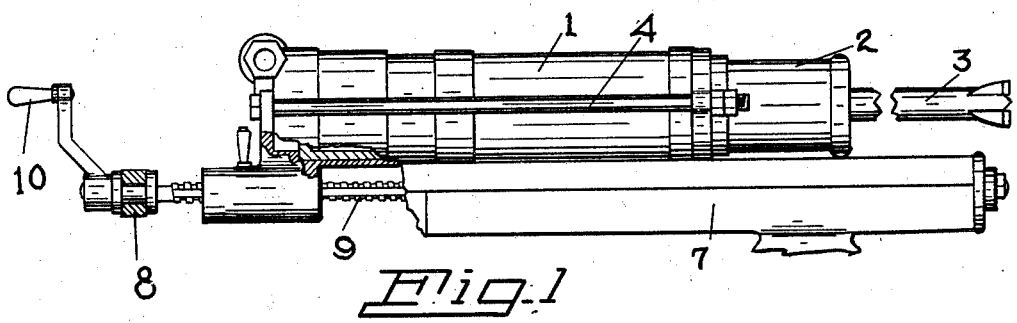
Fig. 1
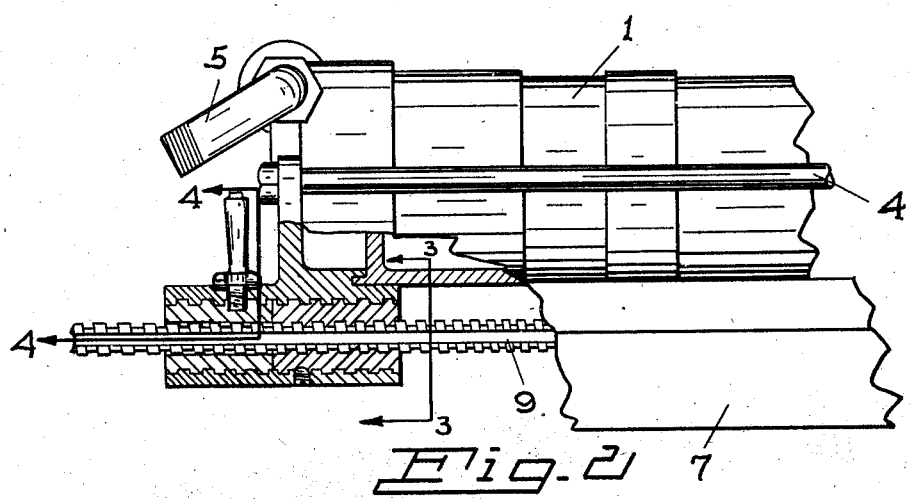
Fig. 2
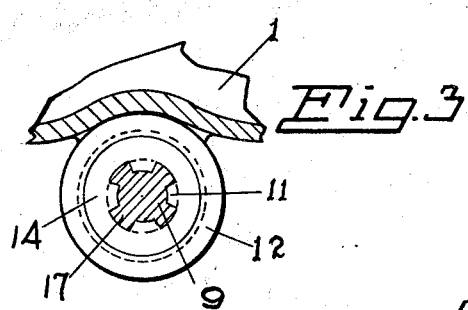
Fig. 3
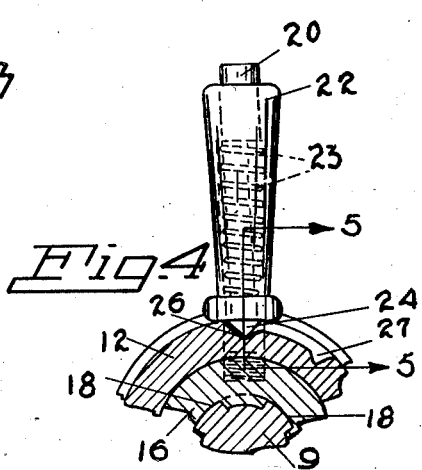
Fig. 4
Fig. 5
ANDREW L. JOHNSON
INVENTOR
BY
ATTORNEY Jan. 26, 1932.  A. L. JOHNSON  1,842,405
ROCK DRILL
Filed Nov. 19, 1930  2 Sheets-Sheet 2
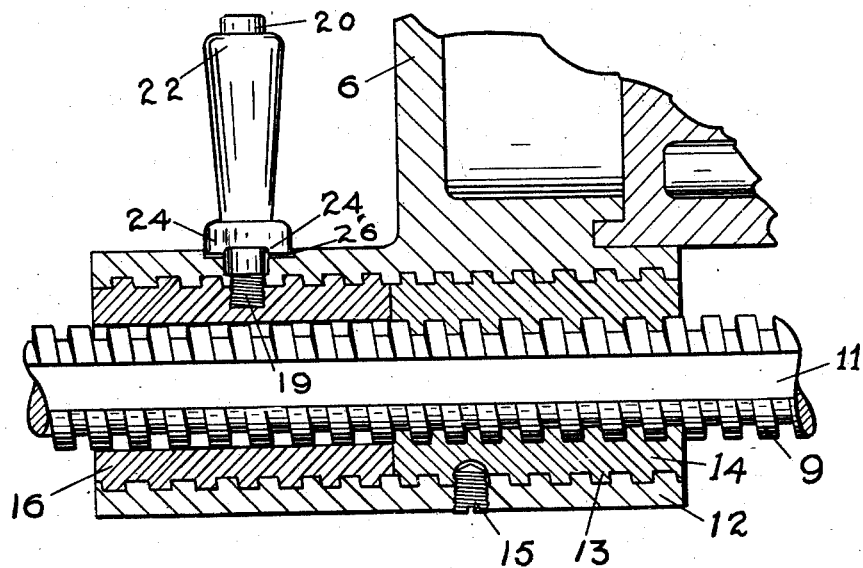
Fig. 6
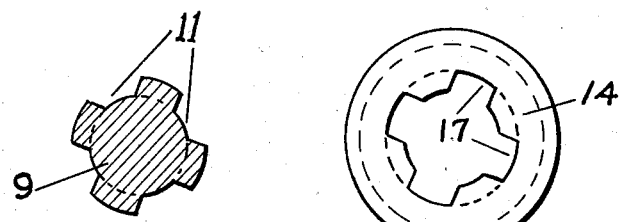
Fig. 8
Fig. 9
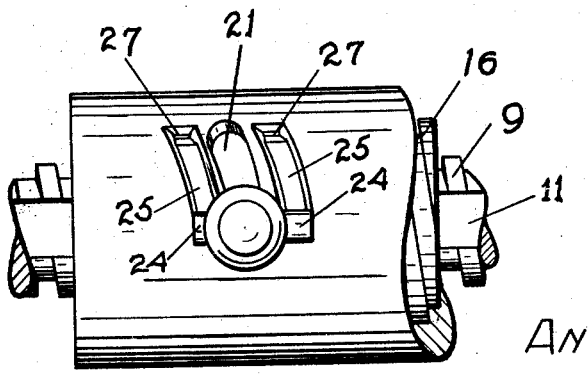
Fig. 7
ANDREW L. JOHNSON
INVENTOR
BY
ATTORNEY Patented Jan. 26, 1932

1,842,405

UNITED STATES PATENT OFFICE

ANDREW L. JOHNSON, OF LUCERNE, WASHINGTON, ASSIGNOR OF ONE-HALF TO JAMES N. JOHNSON, OF LEWISTON, IDAHO

ROCK DRILL

Application filed November 19, 1930. Serial No. 496,660.

My present invention relates to improvements in rock drills of the motive fluid operated, high speed, drifter type, for use in mining, quarrying, drilling of tunnels, and other similar operations. The invention involves the hand operated feed screw mechanism, by means of which the drill is advanced to its work as the drilling operation progresses, and I employ means in connection with the feed mechanism for a quick-acting return of the drill and retraction of the feed mechanism, after the limit of the front feed of the drill has been reached.

In carrying out my invention I utilize a pair of nuts for the screw bar or screw, one of which nuts is movable or partially rotatable with relation to the screw, while the other nut is fixed with relation to the screw, and the screw and nuts are constructed and associated in such manner that the screw engages the threads of both nuts for a forward feed of the drill. For a retraction of the drill the threads of the screw are disengaged from the threads of the nuts, to permit a quick-acting, rear longitudinal, sliding movement of the drill in its guide shell.

The invention consists in certain novel combinations and arrangements of parts as will hereinafter be more fully pointed out and claimed. In the accompanying drawings I have illustrated one complete example of the physical embodiment of my invention wherein the parts are combined and arranged in accordance with the best mode I have thus far devised for the practical application of the principles of my invention.

Figure 1 is a side view of a well known type of rock drill with which my invention is embodied.

Figure 2 is an enlarged view in side elevation of the rear part of the drilling machine, with parts in section.

Figure 3 is an enlarged sectional view at line 3—3 of Figure 2, showing the front of the bushing, and fixed nut, with the feed screw therein.

Figure 4 is a sectional view at line 4—4 of Figure 2 showing part of the partially rotatable nut, and the lever for turning the nut to release the feed screw and permit retraction of the feed mechanism.

Figure 5 is a sectional view of the release lever for the partially rotatable bearing nut of the screw.

Figure 6 is an enlarged, sectional detail view at the rear of the machine, showing the two bearing nuts in section, and part of the feed screw therein.

Figure 7 is a top plan view of part of the bushing enclosing the bearing nuts, and of the release lever which is mounted on the partially rotatable nut, together with the guide slots and grooves for the lever.

Figure 8 is a cross section of the feed screw with its mutilated threads forming longitudinal grooves in the screw.

Figure 9 is a face view of the fixed bearing nut, showing the ends of its longitudinal grooves, or mutilated threads.

In order that the general assembly and relation of parts may readily be understood I have indicated in Figure 1 the cylinder 1 of a pneumatic drill, having the front bushing 2 and drill tool 3. The usual tie bolts 4, air connection 5 and back-head 6 are shown the latter being rigid with the cylinder of the machine.

The guide shell 7 is secured as usual below the cylinder, and forms part of the mount for the machine, and the cross head 8 at the rear of the machine is stationary or rigid with the mount. The feed screw 9 is journaled at its front end in the mount and at its rear end is journaled to turn in the bearings provided therefor in the cross head. The drill is advanced by manual operation of the crank handle 10 that is rigid with the screw. To feed the drill the handle is turned, while for the purpose of retracting the drill the latter is pulled rearwardly to position so that the feed mechanism may again advance the drill 3.

In carrying out my invention the threads of the screw are mutilated, by cutting a number, as four, longitudinally extending grooves 11 through the threads, substantially the length of the screw or screw bar.

The screw is supported in the shell 7, and also within a cylindrical bushing 12 at the rear of the machine, said bushing being fixed stationary with the machine and provided with internal threads 13.

In the front half of the bushing a fixed bearing nut 14 is located and rigidly secured in relation to the bushing by means of a set screw or bolt 15 threaded in the bushing and engaging the nut. The nut has both an external and internal thread, the former to engage threads on the interior of the bushing, and the latter to engage the threads of the screw.

Back of the fixed nut a movable nut 16 is located in the bushing and partially rotatable therein, and this being nut 16 also has external threads to engage the threads of the bushing and internal threads for the screw.

The internal threads of the fixed nut 14 are mutilated by four longitudinally extending grooves 17, and the internal threads of the partially rotatable nut 16 are also mutilated, as by four longitudinally extending grooves 18, these grooves 16 and 18 being arranged complementary to the longitudinally extending grooves of the screw designated as 11.

For advancing the drill as the feed screw is turned by the use of the hand crank 10, the two bearing nuts and their grooves are disjointed, i. e. the grooves of the respective nuts are out of alinement. This relative position of the two bearing nuts is attained by giving the nut 16 a quarter turn, if the grooves are not already out of alinement, and in this turned position of the nut 16, the screw threads engage both bearing nuts. As the screw is turned the engagement of its threads with the bearing nuts advances the drill to its work.

When the bearing nuts are in position so that their respective grooves are jointed or alined, it will be apparent that the drill may be retracted or pulled to the rear with the bushing and its grooved bearing nuts sliding on the screw.

For partially turning the nut 16 through an arc of approximately 90 degrees on the screw and within the bushing, I provide a bolt or pin 19 threaded at one end into the nut 16, and at its other, free end, provided with a head 20. This bolt or pin, as shown in Figure 7 is guided in its movement by the use of a guide slot 21 in the wall of the cylindrical bushing 12, the slot being in the form of an arc. The arcuate slot is also partially screw-shaped or spiral and turns to the rear with the same pitch as the external threads of the nut or the internal threads of the bushing, to insure ready movement of the nut in the bushing and on the screw.

A hollow spring cap or handle 22 is mounted on the pin or lever 19 with the head of the lever, 20, projecting upwardly through the open top of the cap or handle. Within the cap or handle, a spring 23 is coiled about the pin or lever and interposed between the head 20 and the bottom of the cap, the tendency of the spring being to urge the hollow handle or cap toward the bushing.

On the lower end of the cap are fashioned diametrically extending side wings, in the form of detents 24, that are held in place to slide in grooves 25 in the outer periphery of the bushing at the sides of the slot 21. At the ends of these two guide grooves are spaced notches 26 and 27, and the spring holds the detents in one or the other of these pairs of notches, to retain the lever in its adjusted position. When the screw is to be retracted the detents are held in notches 26, and when the bearing nuts are out of alinement, for forward feed of the screw, the detents are held in notches 27.

As thus illustrated and described it will be apparent that by means of the screw the drill may be fed forward in usual manner, and when desired, the feed mechanism may be disconnected with facility by a quick-acting operation on the handle 22 and then the drill retracted.

Having thus fully described my invention, what I claim as new and desire to secure by Letters Patent is:

1. In a rock drill, the combination with a feed screw and a stationary bushing having internal threads, of a fixed bearing nut in the bushing for the screw, a partially rotatable bearing nut having exterior threads for the bushing and interior threads for the screw, and means for rotating said nut, and said screw and nuts having longitudinally extending grooves to permit a forward screw feed of the screw and a rearward slide of the screw in the nuts.

2. In a rock drill, the combination with a feed screw and a stationary bushing having internal threads, of a fixed nut for the screw and a relatively movable nut for the screw, said screw and nuts having longitudinally extending grooves in their threaded portions, and means for turning the movable nut to aline the grooves in said nuts.

3. In a rock drill, the combination with a feed screw and a stationary bushing having internal threads, of a bearing nut having internal and external threads and located in the bushing, means for securing the nut in the bushing, a second, partially rotatable nut in the bushing having internal and external threads, said screw and nuts having complementary longitudinally extending grooves in their threads, and means for shifting the partially rotatable nut to aline the grooves of the nuts and permit withdrawal of the screw.

4. The combination in a rock drill with a fixed bushing having a spirally extending slot, complementary grooves at the sides of the slots and notches at the ends of the grooves, of a fixed nut and a screw therein, a bearing nut having internal and external threads and located in the bushing, said screws and nuts having longitudinally extending grooves in their threaded portions, a lever fixed to the latter bearing nut and projecting through the slot of the bushing, a hollow handle enclosing the lever and a spring within the handle for urging the handle toward the bushing, and a pair of spaced detents on said handle for co-action with the pairs of notches.

In testimony whereof I affix my signature.

ANDREW L. JOHNSON.